June 4, 1946.  R. C. MASON  2,401,576
DEVICE FOR MEASURING LENGTH OF A LINE RUN
INTO OR REMOVED FROM A BORE HOLE
Filed Sept. 22, 1943  2 Sheets-Sheet 1

INVENTOR
Richard C. Mason.
BY
Paul E. Mullendore
ATTORNEY

June 4, 1946.　　　　　R. C. MASON　　　　　2,401,576
DEVICE FOR MEASURING LENGTH OF A LINE RUN
INTO OR REMOVED FROM A BORE HOLE
Filed Sept. 22, 1943　　　　2 Sheets-Sheet 2
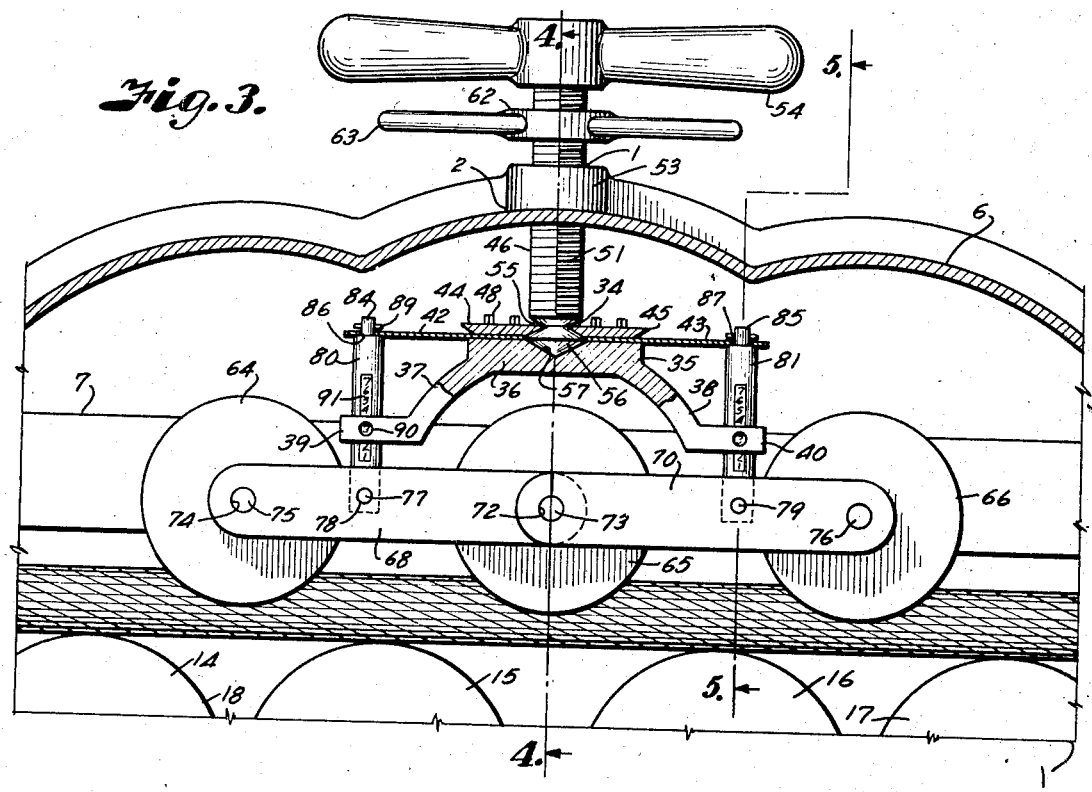
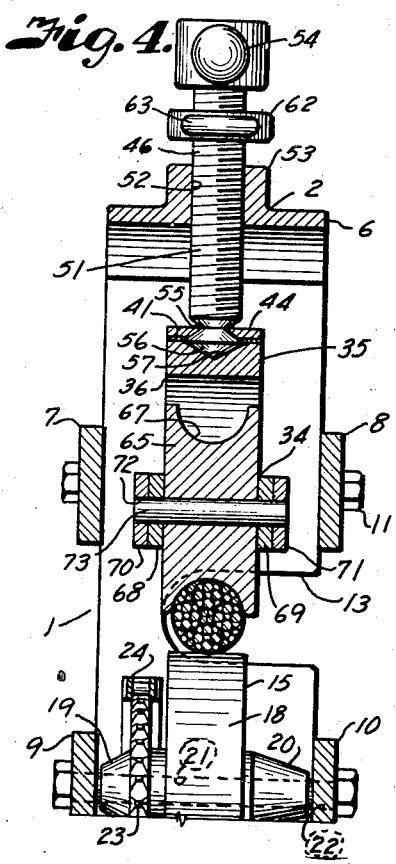
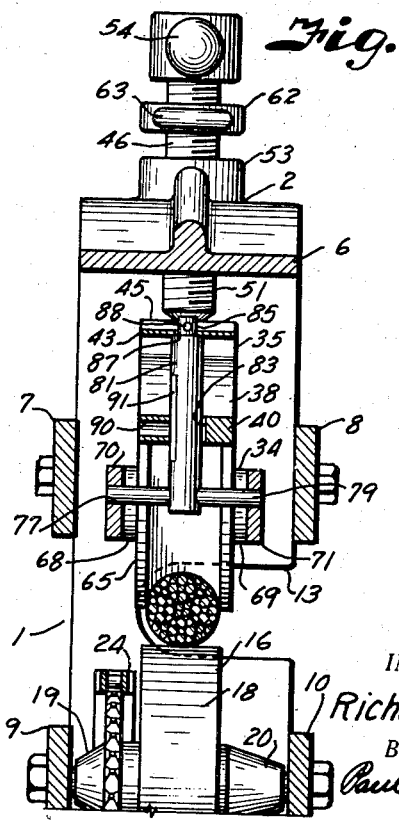
INVENTOR
Richard C. Mason.
BY
Paul E. Mullendore
ATTORNEY Patented June 4, 1946

2,401,576

UNITED STATES PATENT OFFICE 2,401,576

DEVICE FOR MEASURING LENGTH OF A LINE RUN INTO OR REMOVED FROM A BORE HOLE

Richard C. Mason, Tulsa, Okla.

Application September 22, 1943, Serial No. 503,331

14 Claims. (Cl. 73—144)

This invention relates to measuring devices for determining the length of a line or cable played from a given point; for example, the length of line run into or withdrawn from a bore hole when determining the depth thereof or depths at which various operations are to be performed.

The principal objects of the invention are to provide a measuring device capable of extreme accuracy in measurement, to provide a measuring device with a pressure trolley having articulately mounted wheels so that flags, wickers and line splices or other obstacles will not interfere with the accuracy of measurement, to provide for selective adjustment of the pressure exerted by the trolley on the line under measurement, to provide the trolley with indicating means by which the same line tension is maintained for each measurement in a given operation, and to provide the trolley with wheel tensioning means that exerts the desired tension and also cooperates with the yoke of the trolley in mounting the wheel carrying links that form the articulate connection between the wheels of the trolley.

It is a further object of the invention to provide a measure meter that is of simple and reliable construction.

In accomplishing these and other objects of the invention, I have provided improved structure, the preferred form of which is illustrated in the accompanying drawings, wherein:

Fig. 3 is an enlarged fragmentary sectional view through the measuring device, particularly illustrating the pressure trolley and the gauge means for facilitating setting of tension on the line under measurement.

Fig. 4 is a cross section through the measuring device on the line 4—4 of Fig. 3.

Fig. 5 is a similar cross section on the line 5—5 of Fig. 3.

Figure 1:
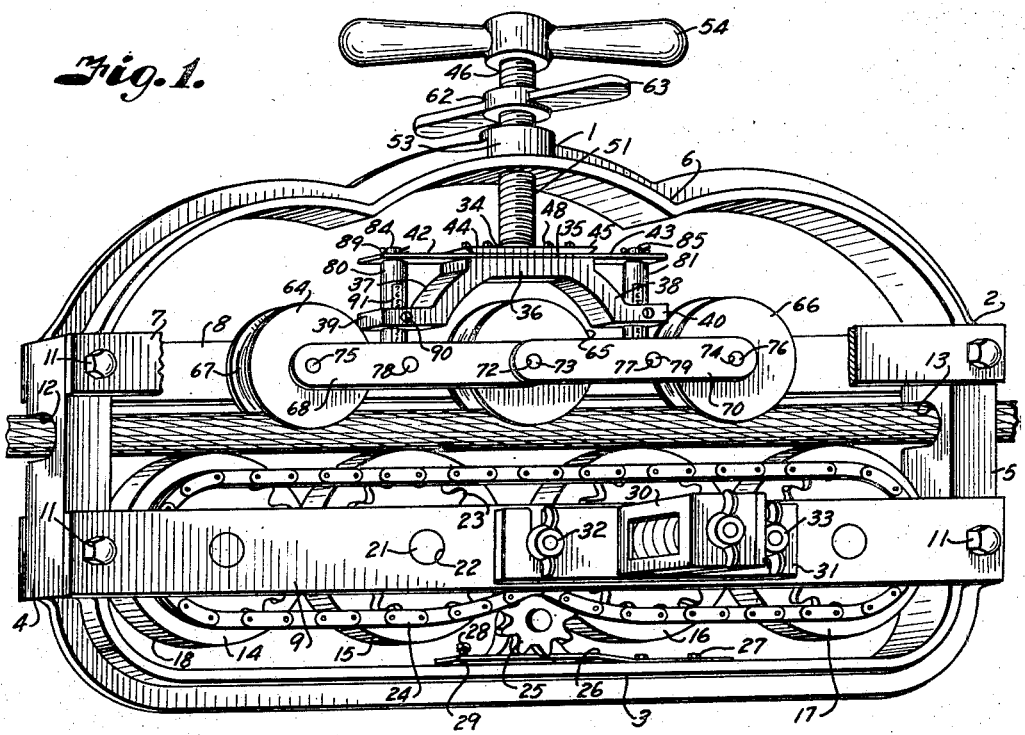
Fig. 1 is a perspective view of a measuring device constructed in accordance with the present invention and illustrating the mounting thereof on a line under measurement.
Figure 2:
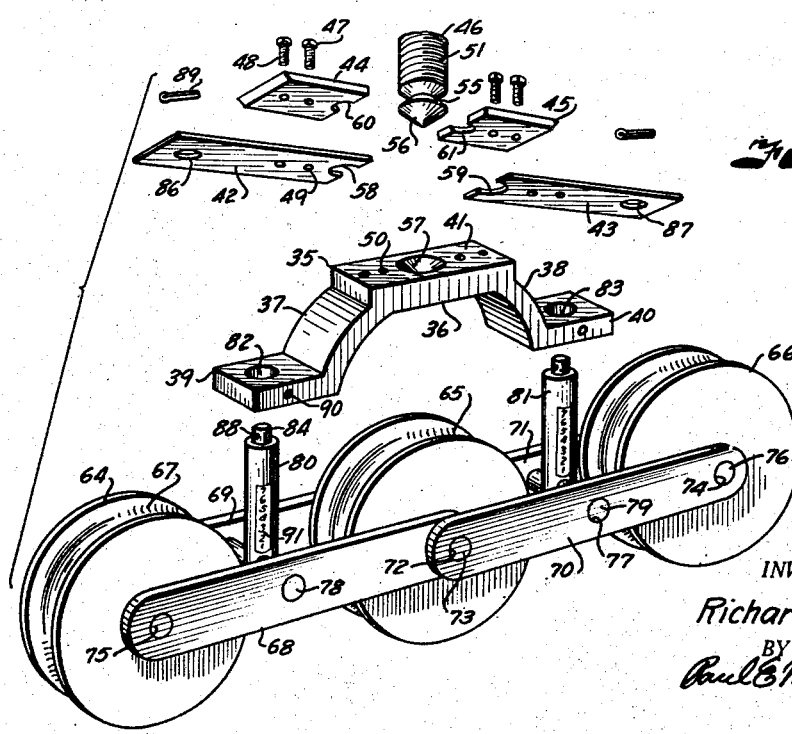
Fig. 2 is a perspective view of the parts of the pressure trolley partly disassembled with the removed parts in spaced relation to better illustrate the construction thereof.

Referring more in detail to the drawings:

1 designates a measuring device constructed in accordance with the present invention and which includes a substantially open frame 2 which mounts the operating mechanism later described. The frame 2 includes a lower bar portion 3, ends 4 and 5 and a substantially arc shaped top bar portion 6. The end bar portions 4 and 5 are preferably integrally connected by the bar portions 3 and 6. The end bars 4 and 5 are also connected at the sides of the frame by upper side bars 7 and 8 and lower bars 9 and 10 that are preferably removably connected by cap screws 11 extending through suitable openings in the longitudinal bars and into threaded sockets in the end bars of the frame.

The end bars of the frame are provided intermediate the upper and lower longitudinal bars with notch-like openings 12 and 13 opening from one side of the frame to accommodate the line or cable to be measured. The lower longitudinal bars form support for the measuring means which includes a plurality of wheels 14, 15, 16 and 17 arranged along the length thereof as shown in Fig. 1. Each wheel has a substantially flat peripheral line traction face 18 of sufficient width to accommodate the largest line that may be passed through the notches 12 and 13. I have found that if the circumference of the wheels is made in exact units of the unit of measure to be employed; for example, one foot, the twist of the line strands, or some other reason, causes inaccuracy in the measurement. This inaccuracy of measurement may be compensated for by using wheels having diameters of substantially 3.819 inches to represent one lineal foot when the device is used for measuring twist stranded cables such as used in well boring operations and the like. The wheels have laterally extending hub portions 19 and 20 and are provided with axial bores mounting axles 21 having their ends suitably mounted within the bearing openings 22 of the longitudinal bars.

Rigidly connected with the hubs 19 of each wheel is a sprocket 23 and operating over the respective sprockets is an endless chain belt 24 adapted to be tensioned by an idler 25 carried on the lower bar portion 3 of the frame at a point intermediate the wheels 15 and 16 as shown in Fig. 1.

In order that the idler may be adjusted with respect to the chain belt, it is preferably carried on a spring leaf 26 having one end secured to the upper face of the bar portion 3 by suitable fastening devices such as cap screws 27. The opposite end of the spring leaf carries a stop set screw 28 having a threaded end 29 adapted to engage the upper portion of the bar portion 3 to effect raising and lowering of the idler sprocket with respect to the frame so that any desired tension may be provided in the chain within the limits of the adjusting screw.

It is thus obvious that rotation of any one of the wheels will impart a corresponding rotation in the other wheels by reason of the chain and sprocket connections, wherefore contact of any one of the wheels with the line will effect actuation of a counter or register 30 that has a driving connection with the axles of one of the wheels; for example, the wheel 16. The counter 30 may be of any standard type and it is preferably removably mounted on the outer side face of the longitudinal bar 9 by a plate 31 that is secured in position by wing nuts 32 and 33, the specific mounting of which forms no part of the present invention.

Cooperating with the measuring wheels just described is a pressure trolley 34 for establishing predetermined tensions of the line against the faces of the measuring wheels to assure positive rotation thereof when the cable is moved with respect to the measuring device. The trolley 34 includes a yoke 35 having a bar portion 36 and downwardly diverging branches 37 and 38 terminating in laterally disposed ears 39 and 40. The bar portion 36 has a flat upper face 41 for seating a tensioning means which, in the illustrated instance, comprises flat spring leaves 42 and 43 having abutting ends seated upon the face 41 with their outer ends projecting over the ears 39 and 40 as shown in Figs. 1 and 3. The seated ends of the springs are retained in position by clamping plates 44 and 45 also having abutting ends arranged to swivelly mount the trolley upon a trolley adjusting screw 46. The clamping plates are retained in position by cap screws 47 having shanks 48 extending through suitable openings in the plate registering openings 49 in the springs and into threaded sockets 50 of the yoke 35.

The adjusting screw 46 includes a threaded shaft 51 rotatably mounted in a threaded bore 52 of a boss 53 on the center of the arch shaped bar portion 6 of the frame. The outer end of the screw has a handle 54 by which the screw is rotated within the threaded bore to move the inner end of the screw toward and away from the measuring wheels.

In order to swivelly mount the trolley on the inner end of the adjusting screw, the adjusting screw has an annular V shaped groove 55 adjacent a cone shaped terminal 56 on the end thereof, which terminal is rotatably mounted within a cone shaped socket 57 in the bar portion of the yoke. The abutting ends of the springs and clamping plates have notch-like openings 58—59 and 60—61 which engage within the groove 55 as best shown in Figs. 3 and 4 to anchor the trolley yoke and permit rotation of the screw relatively to the trolley when making an adjustment of the screw in the frame. The screw also carries a jam nut 62 having laterally extending lever arms 63 by which the nut may be rotated into engagement with the upper face of the boss 53 to retain the screw in adjusted position.

Carried by the trolley yoke are line pressure wheels 64, 65 and 66 having grooved peripheries 67 to accommodate the line as shown in Figs. 1, 4 and 5. The wheels 64, 65 and 66 are connected by articulate joints comprising bars 68—69 and 70—71 having lapping inner ends. The lapping ends of the bars 68 and 70 on one side and the ends of the bars 69 and 71 on the other side of the wheels have registering openings 72 to pass the ends of an axle 73 which mounts the central wheel 65, which wheel is positioned directly under the yoke and with the axis thereof in a plane passing between the measuring wheels 15 and 16. The outer ends of the respective bars are provided with similar openings 74 to mount axles 75 and 76 for the wheels 64 and 66, which wheels are positioned between the measuring wheels 14—15 and 16—17 respectively.

Formed in the bars between the axles of the tensioning wheels are openings 77 for journaling the ends of transverse pins 78 and 79 which carry thrust pins 80 and 81 that project upwardly through guide openings 82 and 83 in the ears 39 and 40 and which have reduced upper ends 84 and 85 that are loosely supported in openings 86 and 87 in the outer ends of the spring leaves 42 and 43. The reduced ends of the thrust pins provide shoulders which are engaged by the lower faces of the leaf springs so that when pressure is applied by the adjusting screw, tension is exerted through the springs on the tension or pressure wheels. The thrust pins are anchored with respect to the leaf springs by providing the reduced ends of the pins with openings 88 for passing cutter pins 89.

In order to provide a gauge or indicator for adjusting the relative tensions applied by means of the springs 42 and 43, the ears 39 and 40 of the yoke 35 are provided with sight openings 90 which register with scales 91 on the thrust pins, the scales being calibrated by suitable designations visible through the sight openings 90 in the ears.

In using the measuring device constructed and assembled as described, the register or counter 30 may be reset to zero or a note taken of the reading of the counterwheels. The jam nut 62 is then backed off from the boss 53 to permit free rotation of the screw shaft 46. The shaft is then rotated to raise the pressure trolley so that the frame may be positioned on the cable with the cable contacting the peripheral faces of the measuring wheels 14 to 17 inclusive. The adjusting screw 46 is then rotated to move the trolley wheels into contact with the cable or line and place it under tension against the peripheral faces of the measuring wheels, the screw being actuated to load the leaf springs 42 and 43 until the proper tension is attained. The jam nut is then retightened against the face of the boss 53. Note is taken of the relative degree of tension through the sight openings 90. In this position the cable or line is received within the grooves of the tensioning or pressure wheels of the trolley and the measuring device is retained on the line ready to measure movement of the line through the frame. As the line moves relatively to the frame, the cable containing the measuring wheel causes rotation thereof, which rotation is carried through the sprocket wheels and connecting chain to the sprocket wheel which drives the counter. By noting the counter, the exact length of line played through the measuring device is ascertained. Should a splice, flag or other projection on the measuring line tend to pass through the measuring device, it will travel smoothly under the pressure wheels since the pressure wheels are free to move by reason of their articulate connections and yielding of the leaf springs. Since at least one of the wheels is always in contact with the measuring line, any slippage or creepage that may occur between the line and the other wheels will not affect accurate registering of the measurement.

In removing the measuring device, the jam nut is loosened so that it may be backed off to permit rotation of the trolley screw to move the trolley away from the cable so that the measuring device is readily removable from the cable or line by drawing the device laterally away from the line with the line passing out of the notches 12 and 13. Should it be found necessary to again apply the measuring device to the line, the pressure wheels may be set to exactly the same tension by turning the adjusting screw until the previously noted designations appear in the sight openings 90 of the trolley yoke.

From the foregoing it is obvious that I have provided a measuring device that is of simple and inexpensive construction and which has an improved trolley structure so as to assure positive and accurate measurement of the line. It is also obvious that the same tension may be maintained on the line by means of the trolley by aid of the designations on the thrust pins and the sight openings in the ears of the yokes.

What I claim and desire to secure by Letters Patent is:

1. A device for measuring length of a line run into or removed from a bore hole including, a frame, a plurality of traction wheels carried by said frame for engaging a line, means interconnecting said traction wheels for positively and simultaneously rotating said traction wheels, a yoke member, a shaft swivelly carrying the yoke member and having threaded engagement with the frame, thrust members slidably supported on the yoke member, leaf springs fixed to the yoke member and having ends connected with the thrust members, pressure wheels carried by the yoke member and cooperating with the traction wheels carried by said frame, pivotally interconnected members having journals mounting the pressure wheels, means connecting the thrust members with the pivotally interconnected members, indicia means on the thrust members and said yoke to indicate the degree of pressure applied by said leaf springs, and a jam nut on the shaft engageable with a part of the frame to lock the shaft from rotation for maintaining the predetermined pressure on said pressure wheel.

2. A device for measuring length of a line run into or removed from a bore hole including, a frame, a plurality of traction wheels carried by the frame for engaging a line, a sprocket rigidly interconnected to said traction wheels, including a chain for positively and simultaneously rotating said traction wheels, a yoke member, a shaft swivelly carrying the yoke member and having threaded engagement with the frame, thrust members slidably supported on the yoke member, leaf springs fixed to the yoke member and having ends connected with the thrust members, pressure wheels carried by the yoke member and cooperating with the traction wheels carried by said frame, pivotally interconnected members having journals mounting the pressure wheels, means connecting the thrust members with the pivotally interconnected members, and pins mounted in said pivotally interconnected members, said pins having indicia thereon for determining the degree of pressure effected by said leaf springs.

3. A device for measuring length of a line run into or removed from a bore hole including, spaced traction rollers for engaging a line, a trolley including a plurality of pressure wheels staggered in relation to said rollers, pivotally connected members mounting said wheels, thrust members connected with the pivotally connected members, means for applying a yielding pressure on said thrust members, means for moving the pressure wheels toward and from the spaced rollers to vary pressure applied by said yieldable pressure applying means, and means carried by the thrust members and pivotally connected members for indicating the degree of pressure applied by said yieldable pressure applying means.

4. A device for measuring length of a line run into or removed from a bore hole including, a frame, spaced traction rollers mounted on the frame for engaging a line, a yoke member, a shaft swivelly connected with the yoke member and having threaded engagement with the frame, thrust members slidably supported on the yoke member, leaf springs fixed to the yoke member and having ends connected with the thrust members, pressure wheels in staggered relation with the rollers, pivotally interconnected members having journals mounting the pressure wheels, means connecting the thrust members with the pivotally interconnected members, and means carried by the thrust members and pivotally connected members for indicating the degree of pressure applied by said thrust members.

5. A device for measuring length of a line run into or removed from a bore hole including, a frame, a plurality of traction rollers journalled in the frame for engaging a line, a yoke member, a shaft swivelly carrying the yoke member and having threaded engagement with the frame, thrust members slidably supported on the yoke member, leaf springs fixed to the yoke member and having ends connected with the thrust members, pressure wheels staggered with respect to the traction rollers for pressing said line against the traction rollers, pivotally interconnected members having journals mounting the pressure wheels, means connecting the thrust members with the pivotally interconnected members, and means carried by the thrust members and pivotally connected members for indicating the degree of pressure applied by said thrust members.

6. A device for measuring length of a line run into or removed from a bore hole including, a frame, a plurality of traction wheels, rollers journalled in the frame for engaging a line, a yoke member, a shaft swivelly carrying the yoke member and having threaded engagement with the frame, thrust members slidably supported on the yoke member, leaf springs fixed to the yoke member and having ends connected with the thrust members, pressure wheels for pressing said line against the traction rollers, pivotally interconnected members having journals mounting the pressure wheels, means connecting the thrust members with the pivotally interconnected members, and scale means on the thrust members of said yoke to indicate the degree of pressure applied by said leaf springs.

7. A device for measuring length of a line run into or removed from a bore hole including, a frame, a plurality of traction rollers journalled in the frame for engaging a line, a yoke member, a shaft swivelly carrying the yoke member and having threaded engagement with the frame, thrust members slidably supported on the yoke member, leaf springs fixed to the yoke member and having ends connected with the thrust members, a plurality of pressure wheels for pressing said line against the traction rollers, pivotally interconnected members having journals mounting the pressure wheels, means connecting the thrust members with the pivotally interconnected members, and cooperating means on the thrust members for said yoke to indicate the degree of pressure applied by said leaf springs.

8. A device for measuring length of a line run into or removed from a bore hole including, a plurality of traction rollers for engaging a line and having a diameter of substantially 3.819 inches, a trolley including a plurality of pressure wheels staggered in relation to said rollers, means interconnecting the traction rollers for positively and simultaneously rotating said rollers, links interconnecting said wheels, thrust members connected with the links, means for applying a yielding pressure on said thrust members, and means for moving the pressure wheels toward and from the traction rollers to vary the pressure applied by said yieldable pressure applying means.

9. A device for measuring length of a line run into or removed from a bore hole including, a frame, a plurality of traction rollers journalled on the frame for engaging a line, means connected with the traction rollers for positively rotating said rollers in unison, a yoke member, a shaft swively carrying the yoke member and having threaded engagement with the frame, thrust members slidably guided on the yoke member, leaf springs fixed to the yoke member and having ends connected with the thrust members, pressure wheels for pressing said line against the rollers, link members having journals mounting the pressure wheels, and means connecting the thrust means with the link members, said traction rollers having a diameter of substantially 3.819 inches.

10. A device for measuring length of a line run into or removed from a bore hole including, a frame, a plurality of traction rollers journalled in the frame for engaging a line, means connecting the traction rollers for positively rotating said rollers in unison, a yoke member, a shaft swively carrying the yoke member and having threaded engagement with the frame, thrust members slidably guided on the yoke member, leaf springs fixed to the yoke member and having ends connected with the thrust members, pressure wheels for pressing said line against the traction rollers, link members having journals mounting the pressure wheels, means connecting the thrust members with the link members, and a jam nut on the shaft engageable with a part of the frame to lock the shaft from rotation for maintaining the predetermined pressure by said pressure wheels.

11. A device for measuring length of a line run into or removed from a bore hole including a frame, a plurality of traction rollers journalled in the frame and engaging a line, means connecting the traction rollers for rotation in unison, a yoke member, a shaft swively carrying the yoke member and having threaded engagement with the frame, thrust members slidably supported on the yoke member, leaf springs fixed to the yoke member and having ends connected with the thrust members, pressure wheels staggered with relation to the traction rollers, pivotally interconnected members having journals mounting the pressure wheels, means connecting the thrust members with the pivotally interconnected members, cooperating means on the thrust members and said yoke to indicate the degree of pressure applied by said leaf springs, and a jam nut on the shaft engageable with a part of the frame to lock the shaft from rotation for maintaining predetermined pressure by said pressure wheels.

12. A device for measuring length of a line run into or removed from a bore hole including, a frame, a plurality of traction rollers carried by the frame for engaging a line, a yoke member having diverging portions provided with thrust pin guide portions, a shaft swively carrying the yoke member and having threaded engagement with the frame, thrust pins slidably supported in said guide portions, leaf springs fixed to the yoke member and having ends projecting over said guide portions and connected with the thrust pins, pressure wheels for pressing said line against the rollers, link members journalling the pressure wheels, means pivotally connecting the thrust pins with the link members, and pressure designations on the thrust pins and said guide portions of the yoke having sight openings for viewing the designations.

13. A device for measuring length of a line run into or removed from a bore hole including a plurality of traction rollers journalled in the frame for engaging a line, a yoke member, a shaft swively carrying the yoke member and having threaded engagement with the frame, thrust members slidably supported in the yoke member, leaf springs fixed to the yoke member and having ends connected with the thrust members, pressure wheels staggered with respect to the traction rollers, pivotally interconnected members having journals mounting the pressure wheels, means connecting the thrust members with the pivotally interconnected members, indicia means on the thrust members and said yoke to represent the degree of pressure applied by said leaf springs, and a jam nut on the shaft engageable with a part of the frame to lock the shaft from rotation for maintaining the predetermined pressure on said pressure wheels.

14. A device for measuring length of a line run into or removed from a bore hole including spaced traction rollers for engaging a line, a trolley including a plurality of pressure wheels staggered in relation to said rollers, thrust members, journal means pivotally connecting said rollers with the thrust member, means for applying a yielding pressure on said thrust members, means for moving the pressure wheels toward and from the spaced rollers to vary pressure applied by said yieldable pressure applying means, and means carried by the thrust members and pivotally connected members for indicating the degree of pressure applied by said yieldable pressure applying means.

RICHARD C. MASON.